(12) United States Patent
Yamamoto et al.

(10) Patent No.: US 6,739,455 B2
(45) Date of Patent: May 25, 2004

(54) DEFECTIVE CAPSULE REMOVING MECHANISM

(75) Inventors: Taizo Yamamoto, Osaka (JP); Hirokazu Konishi, Sakurai (JP)

(73) Assignee: Shionogi Qualicaps Co., LTD, Nara-Ken (JP)

( * ) Notice: Subject to any disclaimer, the term of this patent is extended or adjusted under 35 U.S.C. 154(b) by 117 days.

(21) Appl. No.: 10/197,487

(22) Filed: Jul. 18, 2002

(65) Prior Publication Data

US 2002/0170266 A1 Nov. 21, 2002

Related U.S. Application Data

(62) Division of application No. 09/549,560, filed on Apr. 14, 2000, now Pat. No. 6,434,911.

(51) Int. Cl.[7] .................................................. B07C 5/00
(52) U.S. Cl. ........................................ 209/643; 209/683
(58) Field of Search ................................ 209/643, 659, 209/680, 683; 53/53

(56) References Cited

U.S. PATENT DOCUMENTS

| | | | |
|---|---|---|---|
| 3,693,320 A | 9/1972 | Garland | |
| 3,757,943 A * | 9/1973 | Chae et al. | 209/551 |
| 3,997,058 A | 12/1976 | Greer et al. | |
| 4,091,600 A | 5/1978 | Itoh | |
| 4,172,526 A * | 10/1979 | Moser | 209/625 |
| 4,204,951 A * | 5/1980 | Moser et al. | 209/625 |
| 4,500,012 A | 2/1985 | Ackley | |
| 4,731,979 A | 3/1988 | Yamamoto et al. | |
| 4,802,323 A | 2/1989 | Garris et al. | |
| 4,964,262 A | 10/1990 | Moser et al. | |
| 5,617,710 A | 4/1997 | Goossens et al. | |
| 5,966,910 A | 10/1999 | Ribani et al. | |
| 6,108,030 A | 8/2000 | Yamamoto et al. | |
| 6,539,686 B1 * | 4/2003 | Trebbi | 53/53 |

* cited by examiner

*Primary Examiner*—Donald P. Walsh
*Assistant Examiner*—Matthew J. Kohner
(74) *Attorney, Agent, or Firm*—Birch, Stewart, Kolasch & Birch, LLP

(57) ABSTRACT

A defective capsule removing mechanism is provided wherein a defective capsule discharging window is provided for a capsule pocket and the capsule pocket, is subject to suction through the discharging window so that a cap or a body of a coupling defective capsule is drawn into the defective capsule discharging window in a rolling manner from one end side directed forwardly and then discharged to the outside of the capsule pocket.

5 Claims, 13 Drawing Sheets

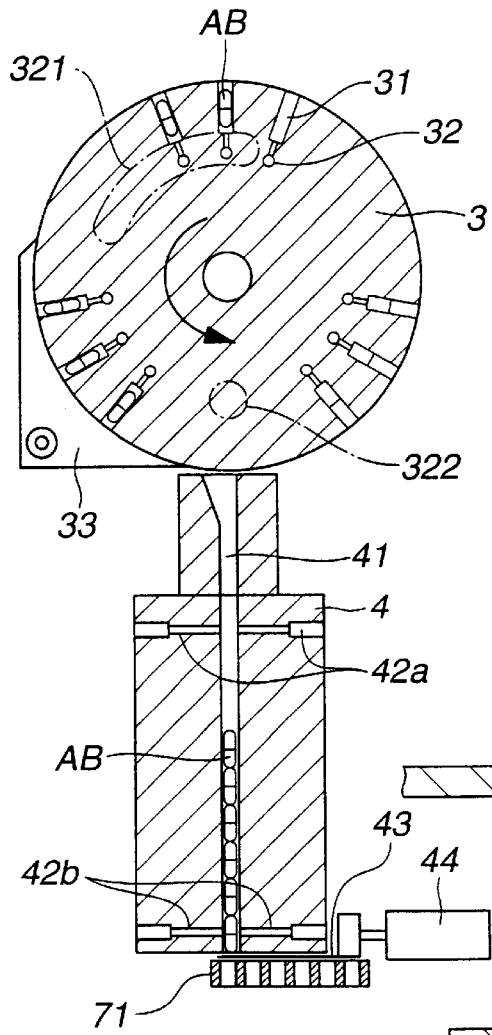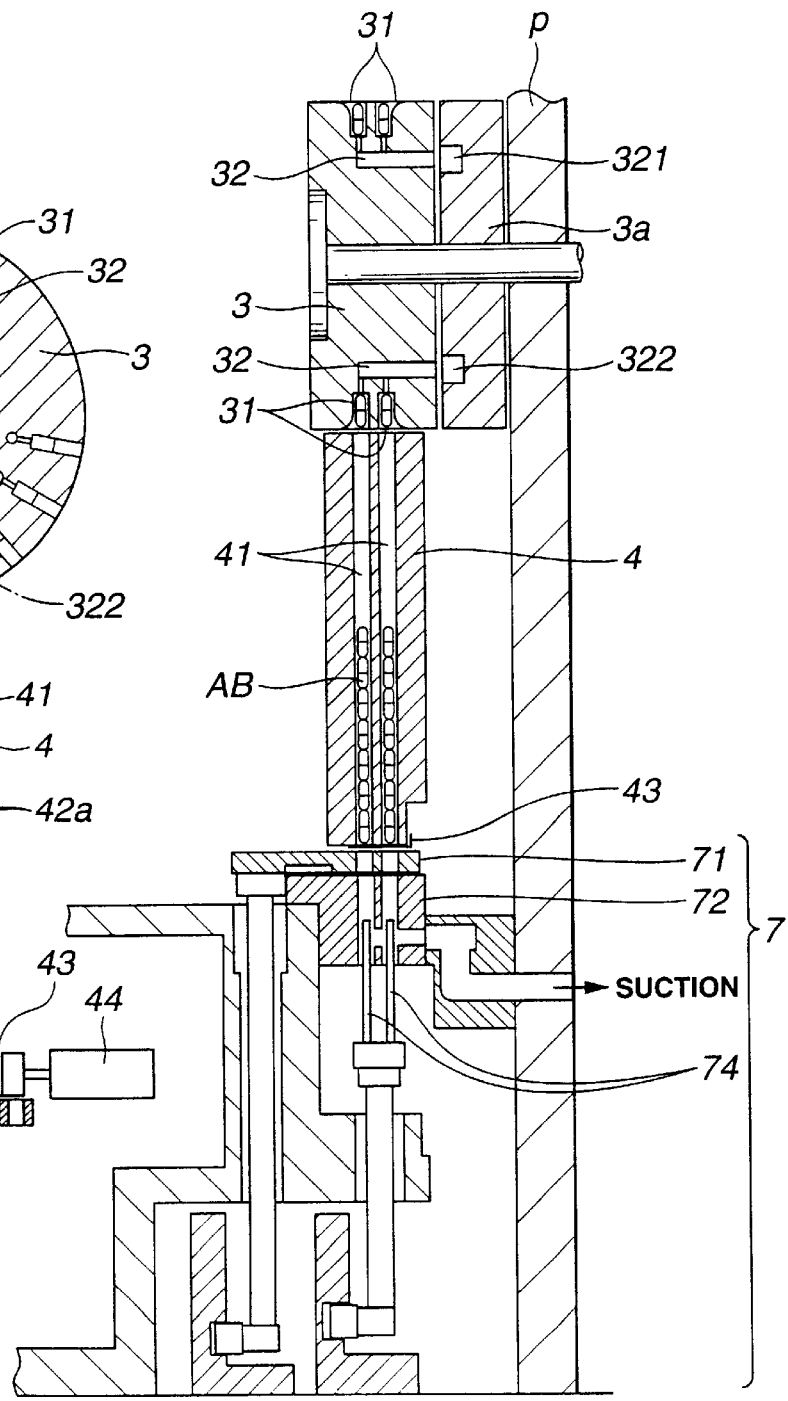

DEFECTIVE CAPSULE REMOVING MECHANISM

This application is a divisional of application Ser. No. 09/549,560, filed on Apr. 14, 2000, now U.S. Pat. No. 6,434,911 the entire contents of which are hereby incorporated by reference.

BACKGROUND OF THE INVENTION

The present invention relates to a defective capsule removing mechanism for discharging and removing, where capsules are accommodated and held in capsule pockets in a capsule filling machine for transportation, a capsule sealing machine or a capsule appearance inspection apparatus, a coupling defective capsule whose cap and body are separate from each other from a capsule pocket, and a defective capsule removing mechanism for removing, when capsules in a horizontally lying state wherein the cap side is directed in a fixed direction are accommodated in and transported by capsule pockets, a capsule in a reversely horizontally lying state wherein the cap side is directed in the reverse direction.

Conventionally, in a capsule filling machine for filling contents substance such as medicine into empty capsules, a capsule sealing machine for applying band seals to filled capsule products such as pharmaceutical capsules wherein medicine or the like is filled therein, or capsule-shaped foods or a capsule appearance inspection machine for performing an appearance inspection of empty capsules or such filled capsule products as described above, a method is adopted wherein empty capsules or filled capsule products (which are hereinafter referred to simply as "capsules") supplied successively are accommodated into and transported in capsule pockets, and while they are transported, filling of contents substance is performed, band sealing is performed, or an appearance inspection is performed.

Further, in such machines and apparatus as described above, it is necessary to control all of capsules supplied at random in a fixed posture by posture control, transport and supply the capsules to a filling mechanism section for filling contents substance, a band sealing mechanism section for applying band seals to boundary portions between the caps and the bodies of the capsules or an inspection mechanism section for photographing the capsules using a camera to detect an appearance defect. To this end, the apparatus mentioned includes a capsule supplying apparatus which stably transports capsules from a hopper or the like to the filling mechanism section, band sealing mechanism section or inspection mechanism section and controls the direction of all of the capsules to be supplied at random to a state wherein they are directed in a fixed direction when they are transported.

For example, the capsule filling machine is constructed such that empty capsules whose caps and bodies are temporarily coupled to each other are transported usually in an erected state wherein the cap is directed upwardly, and, while the empty capsules are transported, they are separated into the caps and the bodies and contents substance is filled into the bodies, and then the caps and the bodies are coupled to each other again thereby to produce filled capsule products. Therefore, a capsule supplying section is required for stably supplying empty capsules supplied at random from a hopper or the like to the filling mechanism section while controlling the posture of each empty capsule in an erected state wherein the cap is directed upwardly.

As such a known capsule supplying section for a capsule filling machine as described above, a supplying mechanism, that is, as shown in FIG. 13, using three transporting drums of a supplying drum 1, a direction controlling drum 2 and a feeding drum 3, capsules are successively transferred and transported among the drums, and while they are transported, the capsules which are supplied at random are controlled in posture to an erected state wherein the cap is directed upwardly. In the following, the supplying mechanism is described briefly. It is to be noted that, in the present specification, the "upward/downward" directions of an empty capsule held on a drum-type transporting unit are upward/downward directions where the outer periphery side of the drum is represented as upward while the center side is represented as downward, and the "erected state" signifies a state wherein the empty capsule is held along a diametral direction of the drum with the cap positioned on the outer periphery side of the drum and with the body directed to the center side of the drum. Further, the "inverted state" signifies a state wherein the empty capsule is held along a diametral direction of the drum with the body positioned on the outer periphery side of the drum and with the cap directed toward the center side of the drum, and the "vertically standing state" signifies a state wherein the empty capsule is held along a diametral direction of the drum irrespective of the directions of the cap and the body.

In particular, reference numeral 1 in FIG. 13 denotes a supplying drum on which a large number of supply pockets for accommodating empty capsules AB each composed of a cap A and a body B temporarily coupled to each other in a vertically standing state therein are formed in a row along a circumferential direction. The supplying drum 1 accommodates and holds empty capsules supplied at random from a hopper h in an uprightly standing state in the supply pockets 11 to transport the empty capsules and transfers the empty capsules to direction controlling pockets 21 of the direction controlling drum 2.

Each of the direction controlling pockets 21 is composed of an upper portion 211 capable of accommodating an empty capsule in a horizontally lying state, and a bottom portion 212 communicated with an end portion of the upper portion 211 and allowing only the body of a capsule to enter. The body B portion of an empty capsule AB introduced into a direction controlling pocket 21 with the body B side thereof directed forwardly enters the bottom portion 212 of the direction controlling pocket 21 until the empty capsule AB is fully accommodated into the direction controlling pocket 21 in an erected state, and the empty capsule AB is transported in this state by rotation of the direction controlling drum 2. On the other hand, an empty capsule AB' introduced into a direction controlling pocket 21 with the cap A side directed forwardly cannot enter the bottom portion 212, but is accommodated once in the direction controlling pocket 21 in an inverted state wherein the body B side thereof projects from an outer circumferential face of the direction controlling drum 2. Then, as the direction controlling drum 2 rotates, the projecting body B portion of the empty capsule AB' is in contact with a direction controlling guide member 22 for thereby being horizontally laid down, so that the empty capsule AB' is accommodated in the upper portion 211 of the direction controlling pocket 21 in a horizontally lying state wherein the cap A is directed in the direction of rotation of the direction controlling drum 2, and the empty capsule AB' is transported in this state. Then, such empty capsules AB in an erected state and the empty capsules AB' in a horizontally lying state are transferred to feeding pockets 31 of the feeding drum 3.

The feeding pockets 31 of the feeding drum 3 are adapted to accommodate empty capsules in an erected state. The empty capsules AB accommodated in an erected state in the direction controlling pockets 21 enter as they are into the feeding pockets 31 with the cap A side directed forwardly and are accommodated into the feeding pockets 31 in an inverted state. Meanwhile, since also the empty capsules AB' accommodated in a horizontally lying state in the upper portions 211 of the direction controlling pocket 21 are in a horizontally lying state wherein the cap A is directed forwardly in the direction of rotation, they enter the feeding pockets 31 with the cap A side directed forwardly so that they are accommodated into the feeding pockets 31 in an inverted state. In this manner, all empty capsules accommodated in the feeding pockets 31 are brought into an inverted state. Then, all of the empty capsules AB are transported by rotation of the feeding drum 3 and discharged from the feeding pockets 31 in an erected state wherein the cap is directed upwardly so that they are supplied to the capsule filling mechanism section which performs separation of empty capsules, filling of contents substance, re-coupling and so forth.

Here, since each empty capsule AB is composed of the cap A and the body B which are temporarily coupled to each other such that they are liable to be separated from each other and are sometimes separated from each other when empty capsules AB are supplied into the hopper h or moved in the hopper h. Thus, separate caps A and bodies B of empty capsules AB may possibly be present in the hopper h. If such a cap A or a body B as described above by itself is accommodated in a supply pocket 11 of the supplying drum 1, then when it is supplied to the capsule filling mechanism section past the direction controlling drum 2 and the feeding drum 3, this gives rise to various problems at various sections. Also there is the possibility that a cap A or a body B in the separate state may be mixed with filled capsule products as final products.

Further, when an empty capsule AB is transferred from a supply pocket 11 of the supplying drum 1 to a direction controlling pocket 21 of the direction controlling drum 2, even if it is kept in an erected state upon entering the direction controlling pocket 21 with the body B side directed forwardly, it sometimes occurs by some reason that the body B portion thereof does not enter the bottom portion 212 of the direction controlling pockets 21 but the empty capsule AB is accommodated into the upper portion 211 of the direction controlling pocket 21 in a reversely horizontally lying state wherein the body B is directed in the direction of rotation or the empty capsule AB is brought into a state wherein the cap A portion thereof projects from the circumferential face of the drum while the empty capsule AB is in an erected state with the cap A directed upwardly and therefore is horizontally laid down by the direction controlling guide member 22 into a reversely horizontally lying state wherein the body B is directed in the direction of rotation. If such a reversely horizontally lying capsule as described above is transferred to a feeding pocket 31 of the feeding drum 3 with the body B side directed forwardly, then this induces that an empty capsule in an erected state with the cap A directed upwardly is mixed in empty capsules held on the feeding drum 3 on which all empty capsules must be in an inverted state with the body B side directed upwardly. If the reversely horizontally lying capsule is supplied to the capsule filling section, then there is the possibility that contents substance may not be filled into the empty capsule and the capsule may be mixed in filled capsule produces as final products while it remains an empty capsule.

Conventionally, such a coupling defective capsule of the body B or the cap A itself or a reverse defective capsule as described above is handled by detecting it with various sensors during transportation by the drums 1, 2 and 3 and removing it by suitable means. However, since detection of a defective capsule by sensors and control for separating and removing the detected defective capsule from the other normal capsules are performed, not only very complicated operation by a complicated mechanism is required, but also there is a limitation to such detection and removal based on sensors and therefore a satisfactory detection and removal ratio cannot be obtained.

SUMMARY OF THE INVENTION

The present invention has been made in view of such circumstances as described above, and it is an object of the present invention to provide a defective capsule removing mechanism wherein a coupling defective capsule which is composed of a body B or a cap A itself alone or a reverse defective capsule can be discharged and removed with certainty by a comparatively simple mechanism.

In order to attain the object described above, according to a first aspect of the present invention, there is provided a defective capsule removing mechanism for removing, when a capsule composed of a cap and a body coupled to each other is accommodated and transported in a capsule pocket, if only the cap or the body of a coupling defective capsule whose cap and body are separated from each other is accommodated into the capsule pocket, characterized in that a defective capsule discharging window shorter in length than that of the capsule is provided in a portion of a circumferential wall of the capsule pocket adjacent one end of the capsule accommodated in the capsule pocket in a longitudinal direction of the capsule for sucking the inside of the capsule pocket therethrough, such that the cap or the body of the coupling defective capsule accommodated in the capsule pocket is drawn into the defective capsule discharging window in a rolling manner from one end side thereof directed forwardly so that the cap or the body of the coupling defective capsule is discharged to the outside of the capsule pocket through the defective capsule discharging window.

That is, the defective capsule removing mechanism according to the first aspect of the present invention described above, if the cap or the body of a coupling defective capsule whose cap and body are separated from each other is accommodated solely into the capsule pocket for accommodating and transporting a capsule, capsule pockets are sucked to remove the coupling defective capsule through the defective capsule discharging window. Consequently, the cap or the body of the coupling defective capsule is discharged from within the capsule pocket through the defective capsule discharging window. In this instance, the defective capsule discharging window is a window formed at one end portion of the capsule pocket having shorter in length than that of the capsule, so that the cap or the body alone having a comparatively small length is drawn into the defective capsule discharging window in a rolling manner from one end side directed forwardly and is then discharged to the outside of the capsule pocket through the defective capsule discharging window. However, since a normal capsule composed of a cap and a body coupled to each other has a length considerably greater than that of the cap or the body alone, it is caught in the capsule pocket and cannot roll out into the defective capsule discharging window, and consequently remains accommodated and held in the capsule pocket as it is.

Accordingly, with the defective capsule removing mechanism according to the first aspect of the present invention, there is no necessity to detect whether an empty capsule accommodated in the capsule pocket is a normal capsule or a coupling defective capsule which is composed of a cap or a body by itself, but by merely sucking the capsule pockets through the defective capsule discharging window, only the cap or the body of the coupling defective capsule is selectively discharged from the capsule pocket. Consequently, a coupling defective capsule can be discharged and removed simply and with certainty without requiring a complicated mechanism, complicated control and so forth.

Further, in order to attain the object described above, according to a second aspect of the present invention, there is provided a defective capsule removing mechanism for removing, when a capsule is accommodated and held in a horizontally lying state with a cap side thereof directed in a fixed direction in a capsule pocket formed on an outer circumferential face of a transport drum being capable of accommodating a capsule in a horizontally lying state and is transported by rotation of the drum and then the capsule is discharged from the capsule pocket at a predetermined angle of rotation to be transferred to a different transporting unit or the like, a reverse defective capsule accommodated in the capsule pocket in a reversely horizontally lying state with the cap side directed in the reverse direction is removed to prevent a reverse defective capsule directed in the opposite direction from being mixed in a group of capsules to be transferred to the different transporting unit or the like, characterized in that one end side of the capsule pocket in which a body side of a capsule is to be accommodated is formed as a cap holding portion which is wider than a diameter of the body of the capsule but narrower than a diameter of the cap of the capsule and a scraper insertion groove extending transversely over the capsule pocket is formed on the outer circumferential face of the transport drum along a circumferential direction of the drum, and a scraper having an end portion thereof inserted in the scraper insertion groove is disposed on the downstream side with respect to a hand-over point to the different transporting unit or the like in a direction of rotation of the drum such that, when a capsule in the reversely horizontally laid state with the cap directed in the reverse direction is accommodated into the capsule pocket, the capsule is brought into a state wherein the cap portion of the capsule is fitted into the cap holding portion of the cap pocket and cannot be pulled out readily so that the capsule is not discharged from the capsule packet at the hand-over point to the different transporting unit or the like, but is further transported to the downstream side in the direction of rotation of the drum, whereafter the capsule is scraped out from the capsule pocket by the scraper.

That is, the defective capsule removing mechanism discharges and removes, when a capsule is accommodated and held in a horizontally lying state with a cap side thereof directed in the fixed direction in the capsule pocket formed on the outer circumferential face of the transport drum and is transported and then discharged at the predetermined angle of rotation and transferred to the different transporting unit or the like, a reverse defective capsule accommodated in the capsule pocket in a reversely horizontally lying state with the cap side directed in the opposite direction from the capsule pocket and recovers the reverse defective capsule. Since the one end side of the capsule pocket in which the body side of a capsule is to be accommodated is formed as the cap holding portion which is narrower than the cap of the capsule, the reverse defective capsule in the reversely horizontally lying state with the cap directed in the opposite direction is put into a state wherein the cap portion thereof is confined to the cap holding portion and cannot be drawn out readily from the capsule pocket. Thus, the reverse defective capsule is not transferred to the different transporting unit at the predetermined angle of rotation, but keeps on going for further transportation. Then, the reverse defective capsule is compulsorily scraped out from the capsule pocket by the scraper on the downstream side in the direction of rotation of the transport drum and is recovered.

Accordingly, with the defective capsule removing mechanism according to the second aspect of the present invention, a reverse defective capsule is automatically disabled from being transferred to the different transporting unit or the like without the necessity to perform any operation and without the necessity for a complicated mechanism for detecting whether a capsule accommodated in the capsule pocket is a capsule in a normal horizontally lying state directed in the predetermined direction or a reverse defective capsule in a horizontally lying state directed in the opposite direction or for selectively discharging and removing a detected reverse defective capsule, and in this state, the reverse defective capsule passes by the hand-over point to the transporting unit or the like and is then compulsorily removed from the capsule pocket automatically by the scraper at the predetermined location on the downstream side with respect to the hand-over point to the transporting unit or the like in the transportation direction to which a normal capsule is not transported at all. Consequently, a reverse defective capsule can be discharged and removed simply and with certainty without the necessity for a complicated structure, cumbersome control and so forth.

BRIEF DESCRIPTION OF THE DRAWINGS

FIGS. 9A and 9B are sectional view showing a transporting drum and a magazine which form the supplying section;

DESCRIPTION OF THE PREFERRED EMBODIMENT

Figure 1:
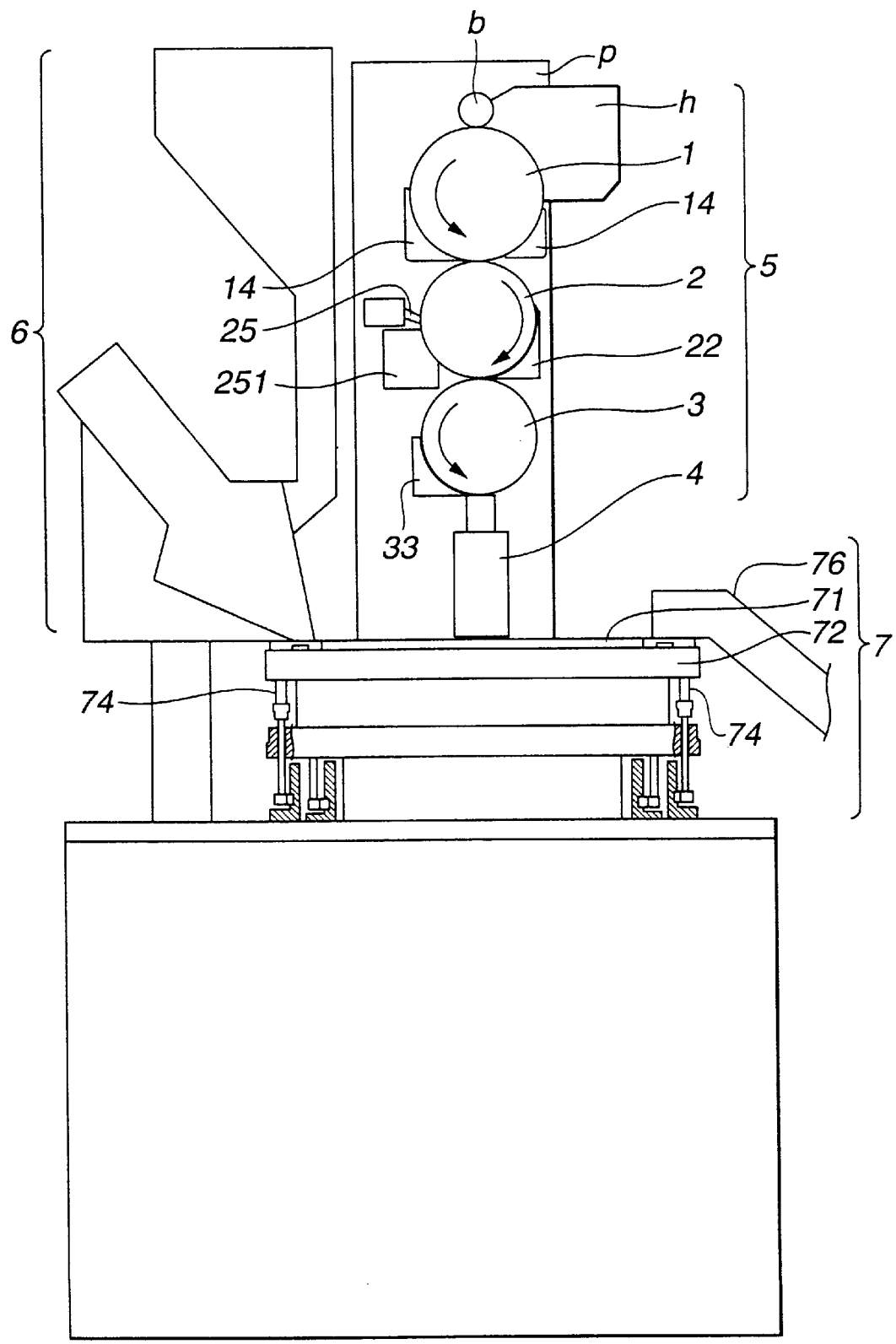
FIG. 1 is a schematic front elevational view showing a capsule filling machine which includes, in a supply section thereof, a defective capsule removing mechanism according to an embodiment of the present invention.
Figure 2:
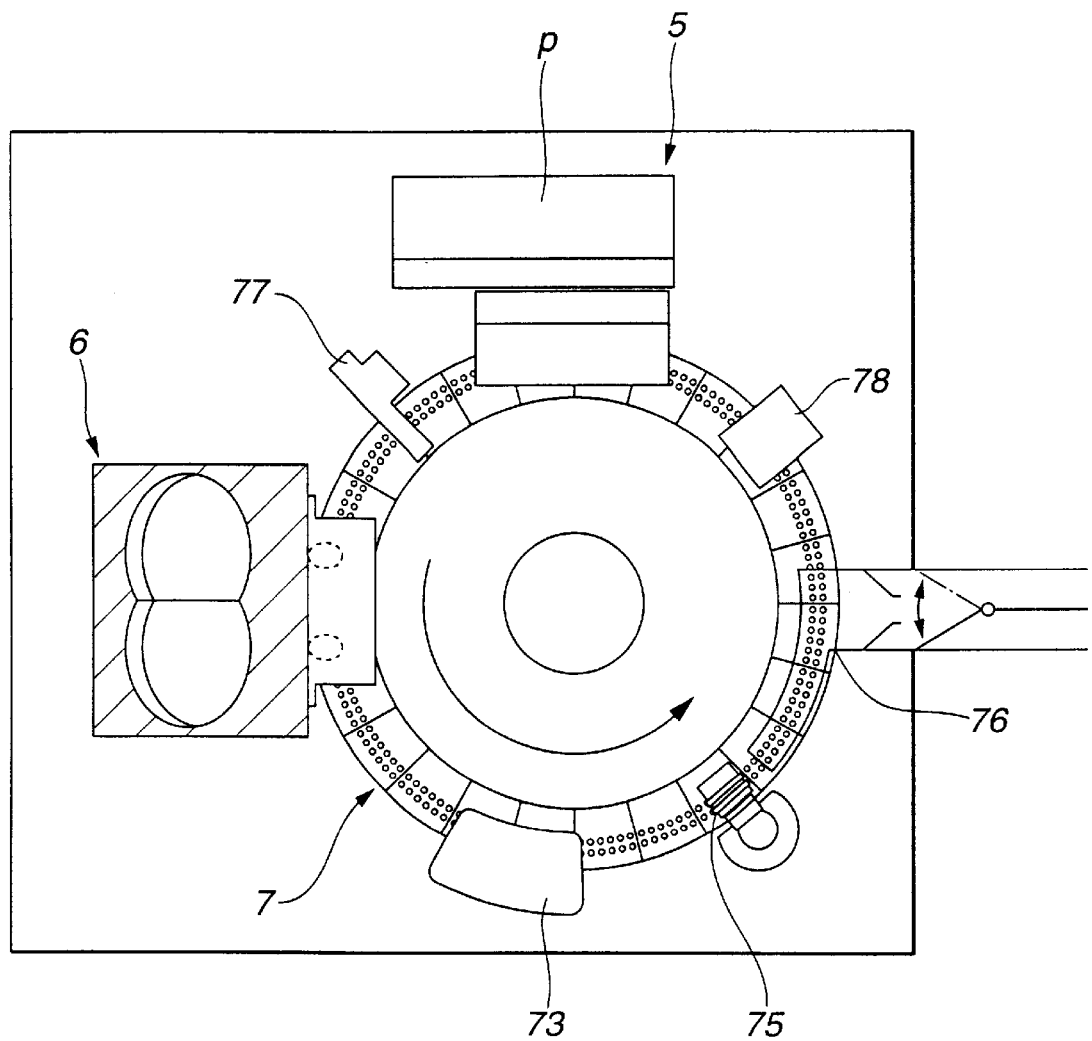
FIG. 2 is a schematic plan view showing the capsule filling machine.

FIGS. 1 and 2 show a capsule filling machine having a supplying section 5 which includes a defective capsule removing mechanism according to the first aspect and the second aspect of the present invention described above. The capsule filling machine successively supplies, by means of the supplying section 5, empty capsules each formed from a cap and a body temporarily coupled to each other (such capsules are hereinafter referred to merely as "empty capsules") in an erected state wherein the cap is directed upwardly, transports the empty capsules keeping such the erected state by means of a transporting apparatus of a filling mechanism section 7, separates the empty capsules into caps and bodies during transportation, fills contents substance into the bodies by a contents substance filling apparatus 6, and couples the caps and the bodies again to each other to produce filled capsule products, and then discharges the filled capsule products from the apparatus and recovers them.

The supplying section 5 includes, as shown in FIG. 1, a supply drum (transporting drum) 1 for successively supplying empty capsules accommodated in a hopper h in a state where empty capsules in an vertically erected state with the cap directed upwardly and empty capsules in an inverted state with the body directed upwardly are mixed together, a direction controlling drum 2 for controlling the directions of the empty capsules received from the supply drum 1, a feeding drum 3 for receiving the empty capsules all in an inverted state with the body directed upwardly from the direction controlling drum 2 and transporting the received empty capsules downwardly, and a magazine 4 for loading the empty capsules in an erected state received from the feeding drum 3 into capsule pockets provided on the transporting unit of the filling mechanism section 7.

Figure 5A:
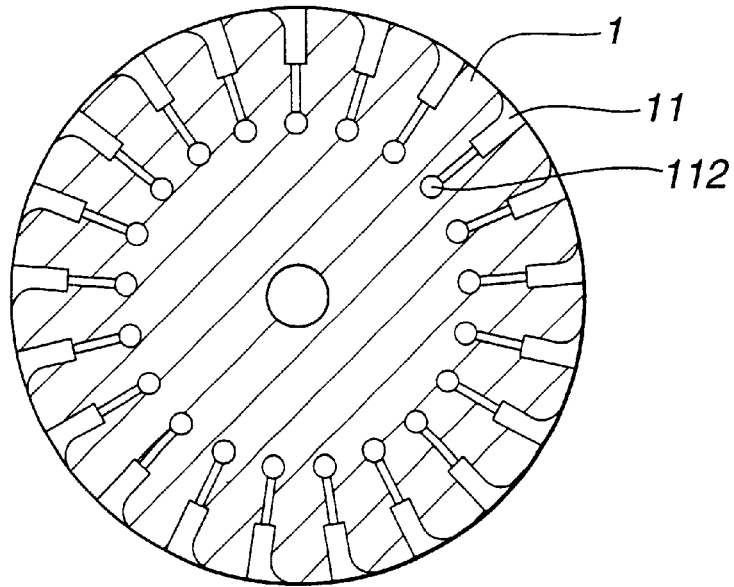
FIGS. 5A and 5B are sectional views showing a supply drum which forms the supplying section.
Figure 5B:
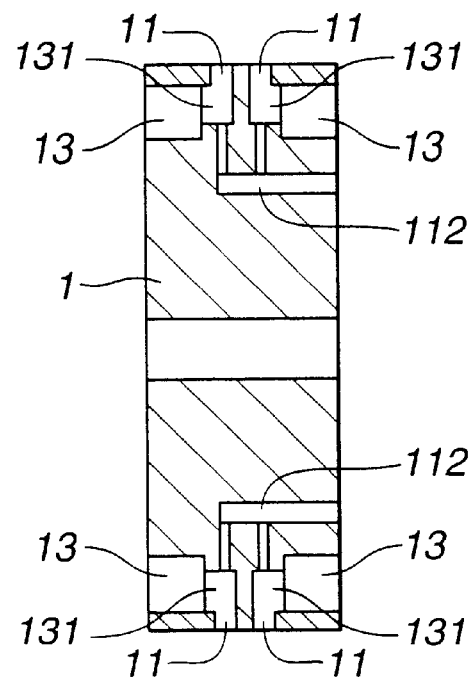

As shown in FIGS. 5A and 5B, two rows of 21 supply pockets 11 capable of accommodating empty capsules in a vertically standing state therein are formed along a circumferential direction on a circumferential face of the supply drum 1. When the supply drum 1 rotates in the counterclockwise direction in FIG. 1, empty capsules AB stored in the hopper h are successively accommodated into the supply pockets 11.

Each of the supply pockets 11 is formed in such a shape that an opening thereof is partly expanded in a direction of rotation so that an empty capsule from the hopper h can be introduced readily into the supply pocket 11, and is communicated with a suction/blowing out hole 112 formed along an axial direction of the supply drum 1 in the proximity of the diametrally inner side of the supply drum 1. As shown in FIG. 5B, one suction/blowing out hole 112 is communicated with two supply pockets 11, 11 which are juxtaposed along a widthwise direction of the supply drum 1 and is open to one side face of the supply drum 1. Further, each supply pocket 11 has a defective capsule discharging window 131 provided at a lower portion thereof, which communicates with a capsule discharging space portion 13 which is open to the outer side face of the supply drum 1.

Figure 3:
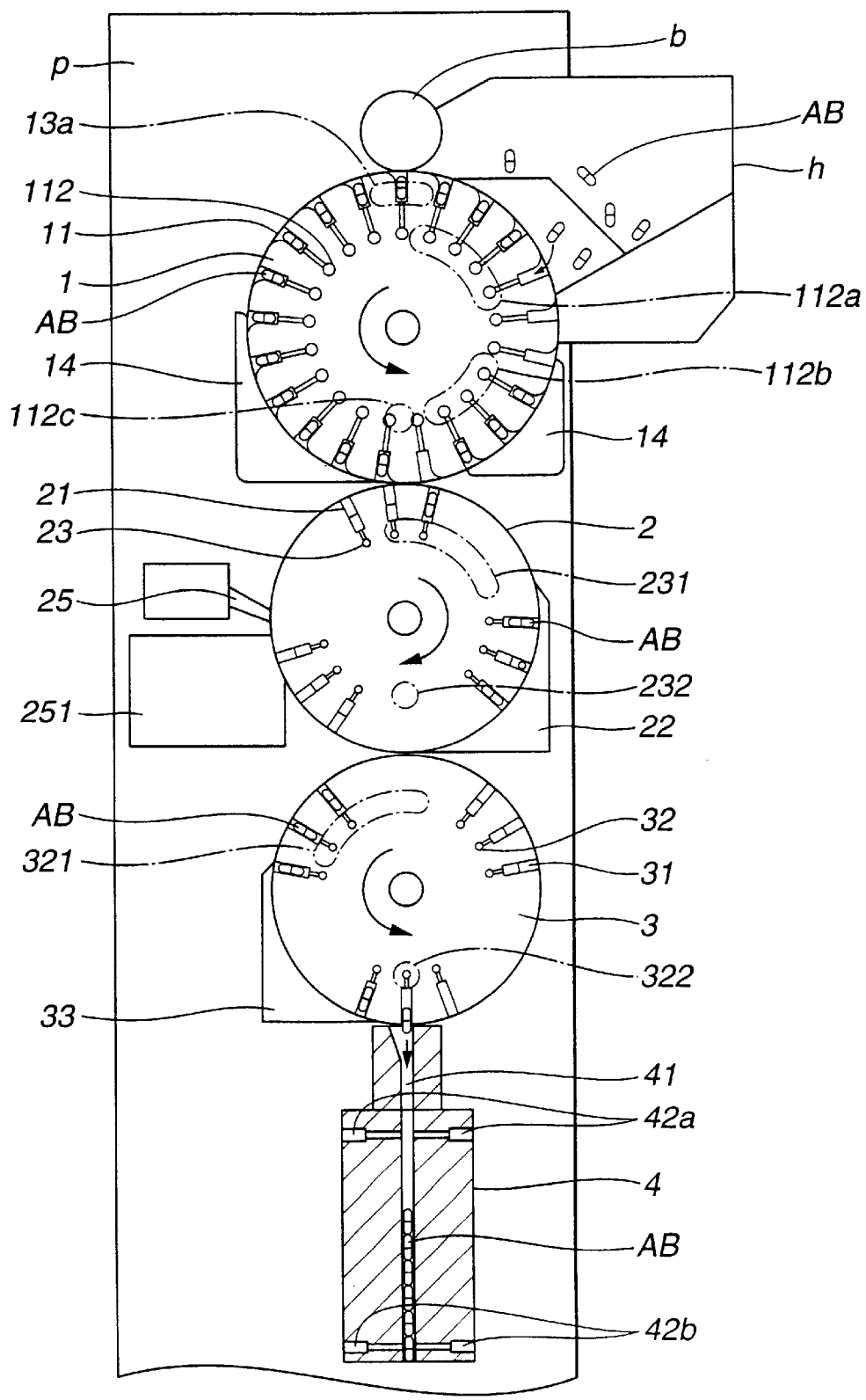
FIG. 3 is a schematic view showing the supplying section of the capsule filling machine.
Figure 4:
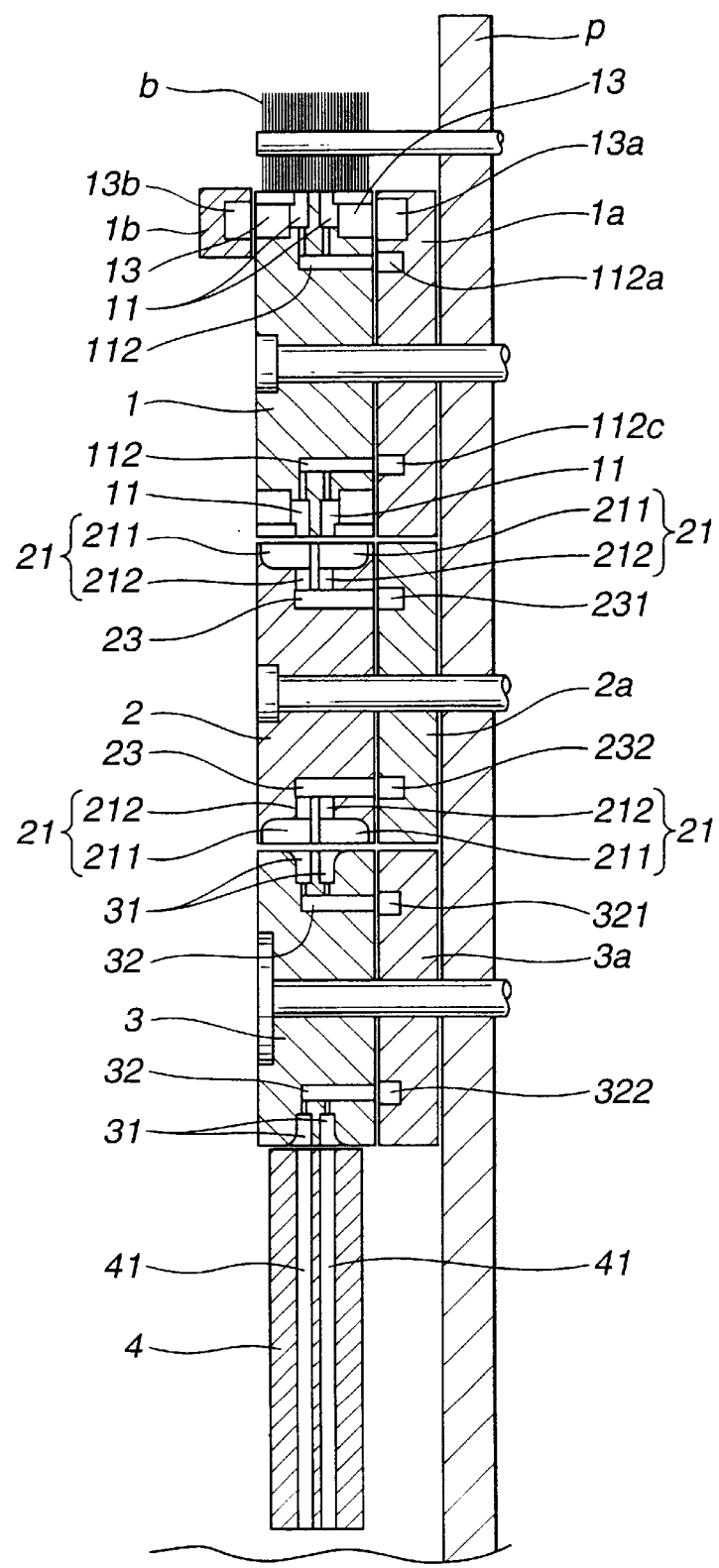
FIG. 4 is a schematic sectional view showing the supplying section.
Figure 6A:
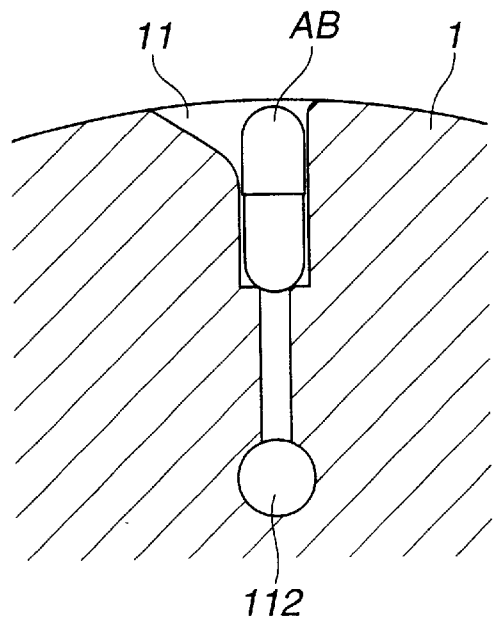
FIGS. 6A and 6B are enlarged sectional views showing an empty capsule accommodated and held in the supply drum and illustrating a behavior of the empty capsule.
Figure 6B:
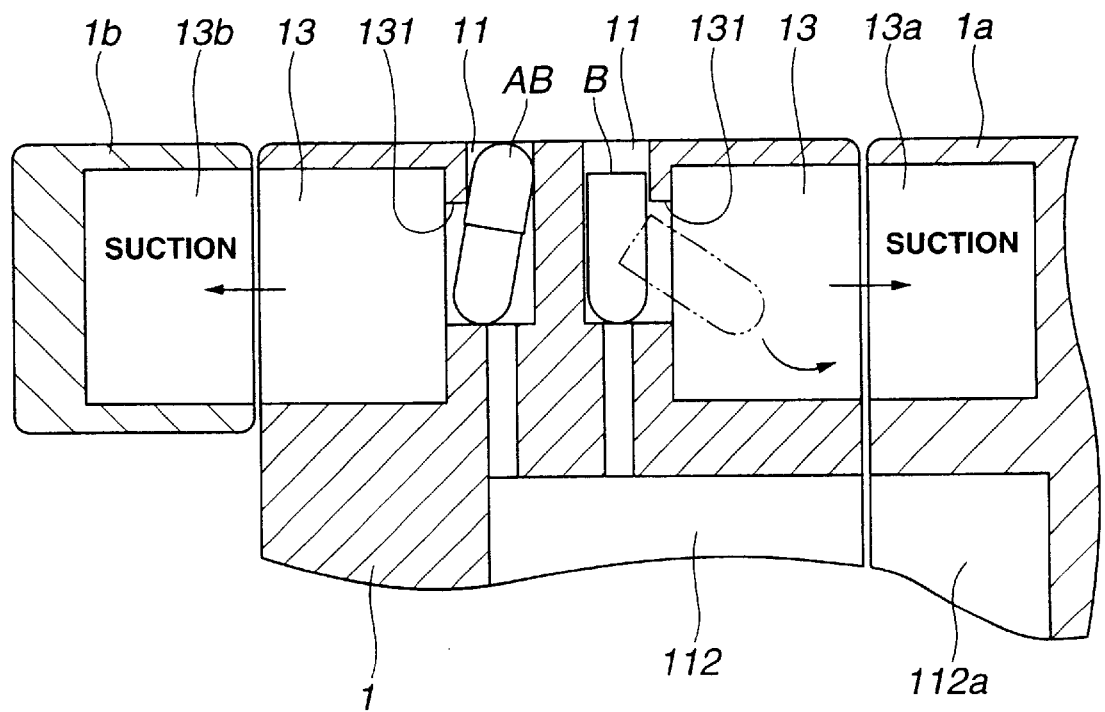

Meanwhile, as shown in FIG. 4, a first suction and exhaust block 1a is disposed between the supply drum 1 and a column p which supports the supply drum 1 for rotation thereon, and three suction paths 112a, 112b and 13a and one compressed air path 112c are provided on a front face side of the suction and exhaust block 1a (adjacent the supply drum 1) as shown in FIGS. 3 and 4. In a condition where the suction paths 112a and 112b and the suction/blowing out holes 112 are registered with each other, the insides of the supply pockets 11 are subject to suction, but in another condition where the compressed air path 112c and a suction/blowing out hole 112 are registered with each other, air is blown out into the supply pocket 11. Meanwhile, as shown in FIG. 4 and FIGS. 6A and 6B, a small suction block 1b having a suction path 13b opposing to the suction path 13a is disposed on the opposite side to the first suction and exhaust block 1a with respect to the supply drum 1, and in a condition where the suction path 13b of the small suction block 1b and the suction path 13a of the first suction and exhaust block 1a are registered with the capsule discharging space portions 13, the insides of the supply pockets 11 are subject to suction from the side face sides thereof.

Further, as shown in FIGS. 1 and 3, a pair of right and left guide members 14, 14 for preventing capsules from slipping out are provided along a circumferential face of the supply drum 1 such that they extend vertically from middle portions thereof toward the lower side of the supply drum 1. A capsule discharging gap is provided between the two guide members 14, 14 at a position just below the supply drum 1.

Figure 7A:
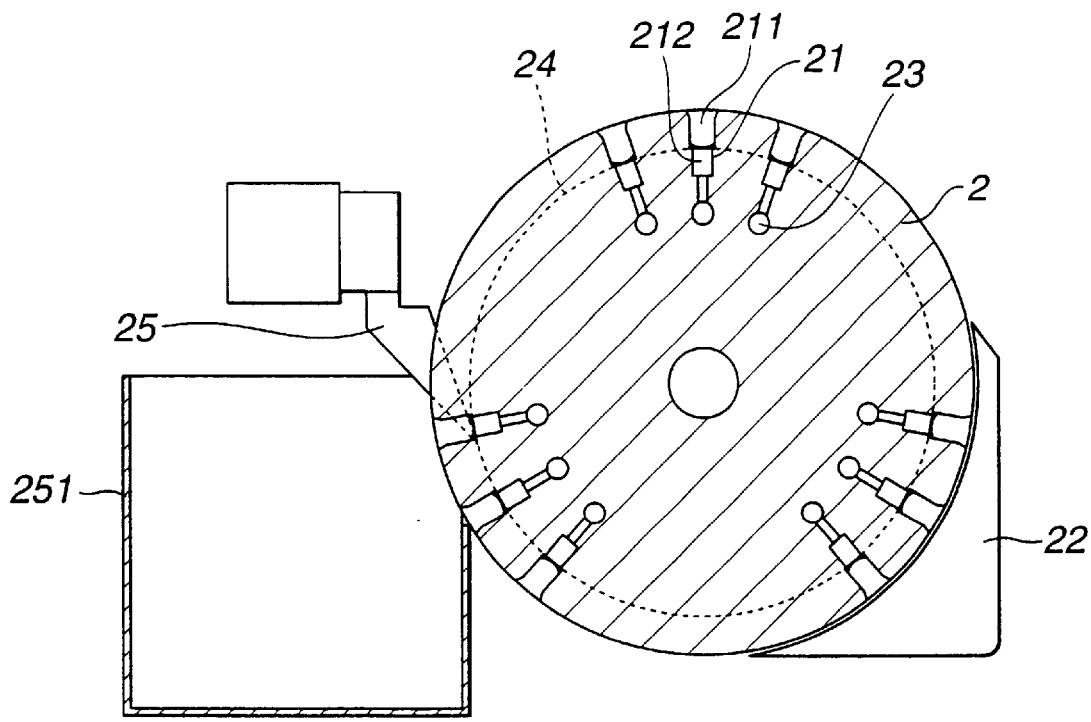
FIGS. 7A and 7B are schematic views showing a direction controlling drum which forms the supplying section.
Figure 7B:
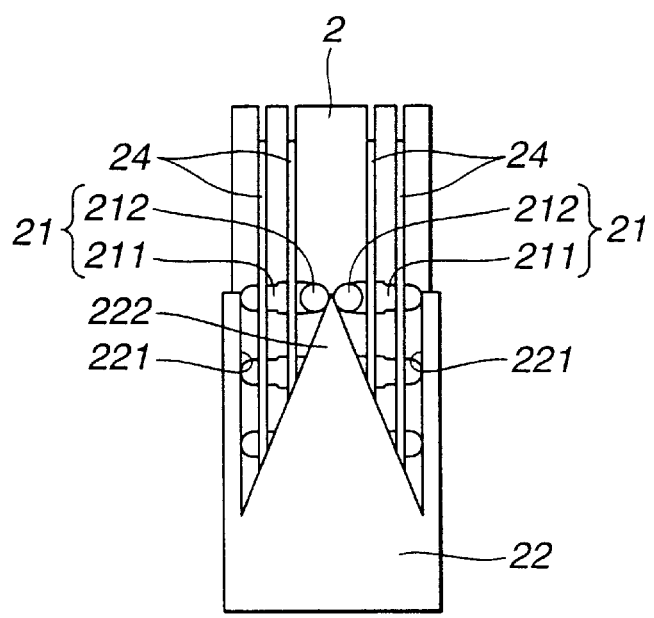
Figure 8A:
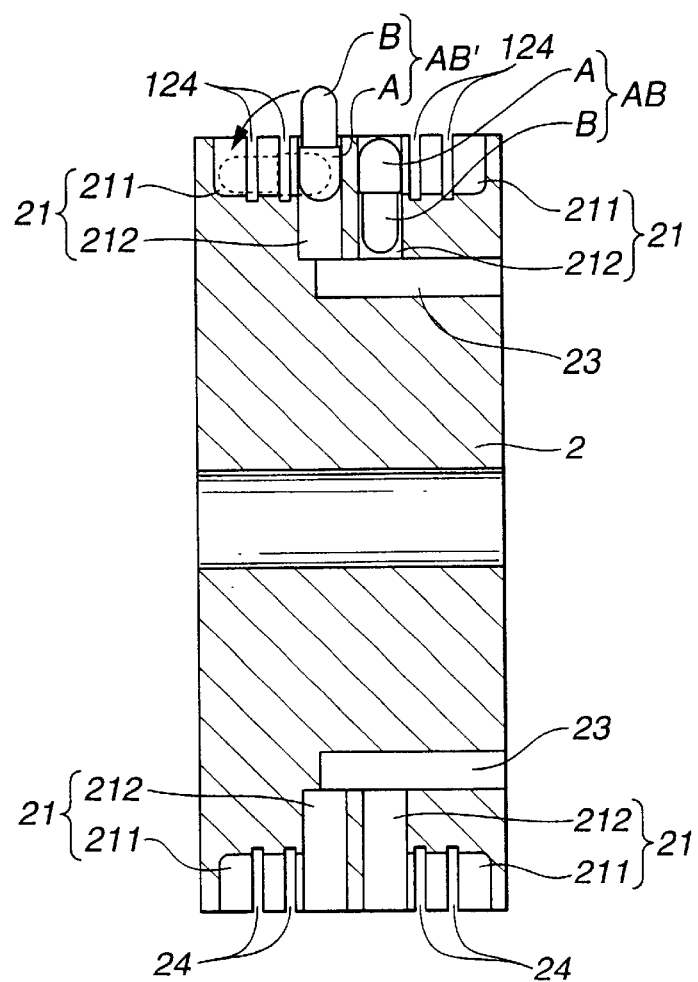
FIG. 8A is an enlarged sectional view showing the direction controlling drum and FIG. 8B is an enlarged plan view showing a direction controlling pocket provided on the direction controlling drum.
Figure 8B:
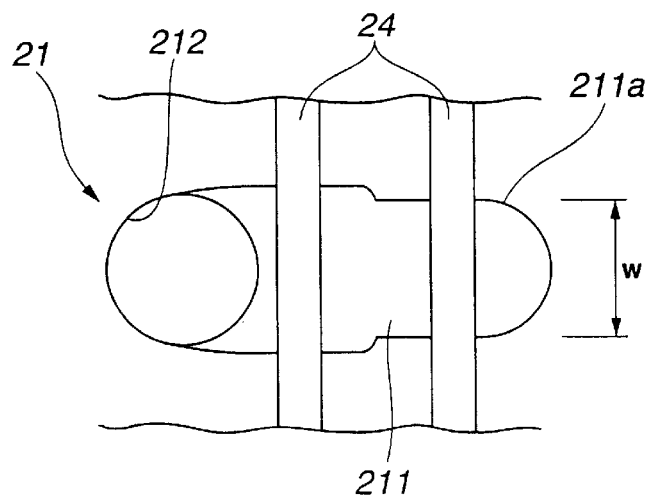

Meanwhile, the direction controlling drum 2 is formed with a diameter smaller than the supply drum 1 and is disposed below the supply drum 1 such that a circumferential face thereof is close to the supply drum 1. The direction controlling drum 2 rotates in the direction (in the clockwise direction in FIGS. 1 and 3) opposite to that of the supply drum 1 at an equal circumferential speed to that of the supply drum 1. As shown in FIGS. 7A and 7B, three sets of direction controlling sections each including six, in total, direction controlling pockets 21 arranged in three rows by two columns are provided with an equal space given from each other in a circumferential direction on the circumferential face of the direction controlling drum 2. As shown in FIGS. 8A and 8B, each of the direction controlling pockets 21 is composed of an upper portion 211 having a substantially elongated elliptical shape capable of accommodating an empty capsule AB, which includes a cap A and a body B temporarily coupled to each other, in a horizontally lying state along a widthwise direction of the direction controlling drum 2, and a bottom portion 212 communicated with an end portion of the upper portion 211 and having a diameter set such that the cap portion A of an empty capsule AB cannot enter the bottom portion 212 but only the body portion B can enter the bottom portion 212.

As shown in FIG. 8A, the bottom portion 212 of each of the direction controlling pockets 21 is communicated with a suction/blowing out hole 23 formed in the proximity of a diametrally inner side of the direction controlling drum 2, and one suction/blowing out hole 23 is communicated with two direction controlling pockets 21, 21 juxtaposed along a widthwise direction of the direction controlling drum 2 and is open to one side face of the direction controlling drum 2. Further, as shown in FIG. 4, a second suction and exhaust block 2a is disposed between the column p on which the direction controlling drum 2 is supported and the direction controlling drum 2 in a similar manner as in the case of the supply drum 1 described hereinabove, and a suction path 231 and a compressed air path 232 are provided on a front face side of the second suction and exhaust block 2a (adjacent the direction controlling drum 2) as shown in FIGS. 3 and 4. In a condition where the suction path 231 and the suction/blowing out hole 23 are registered with each other, the inside of the direction controlling pocket 21 is subject to suction, but in another condition where the compressed air path 232 and the suction/blowing out hole 23 are registered with each other, air is blown out into the direction controlling pocket 21.

Meanwhile, as shown in FIG. 8B, the upper portion 211 of each of the direction controlling pockets 21 is formed as a cap holding portion 211a with opposed end side thereof has a reduced width. The width W of the cap holding portion 211a is set to a little greater than the diameter of the body B of the empty capsule AB, but a little smaller than the diameter of the cap A, so that an empty capsule AB accommodated in the upper portion 211 of the direction controlling pocket 21 with the cap A thereof directed to the cap holding portion 211 a side is held at the cap A portion by the cap holding portion 211a and cannot be discharged readily. Further, two sets of scraper insertion grooves 24 each including two scraper insertion grooves 24 are formed along a circumferential direction of the drum 2 on the outer circumferential face of the direction controlling drum 2 as shown in FIGS. 7A, 7B and 8A, 8B. The two sets of scraper insertion grooves 24, 24 extend across the upper portions 211 of the direction controlling pockets 21.

As shown in FIGS. 1, 3, 7A and 7B, a direction controlling guide member 22 for preventing the empty capsule AB from slipping out and controlling direction of empty capsules AB accommodated in the direction controlling pockets 21 is provided along the one circumferential face of the direction controlling drum 2 over an approximately ¼ circumferential portion thereof from one side portion (right side portion in the figures) to the lower side. The direction controlling guide member 22 has two V-shaped grooves 221, 221 formed thereon corresponding to the direction controlling pockets 21 as shown in FIG. 7B, and a mountain-like shaped portion formed between the V-shaped grooves 221, 221 serves as a direction controlling protrusion 222 for laying down an empty capsule AB accommodated in the direction controlling pocket 21 in an inverted state into a horizontally lying state.

Further, as shown in FIGS. 1, 3, 7A and 7B, four spike-shaped scrapers 25 are disposed at the other side portion of the circumferential face of the direction controlling drum 2 (on the side opposite to the direction controlling guide member 22), and extremities of them are fitted in the scraper insertion grooves 24. Further, a recovery can 251 for recovering empty capsules AB discharged from the upper portions 211 of the direction controlling pockets 21 by the scrapers 25 is disposed below the scrapers 25.

The feeding drum 3 is formed with a diameter smaller than that of the supply drum 1 similarly to the direction controlling drum 2 described hereinabove and is disposed below the direction controlling drum 2 in a condition where a circumferential face thereof is close to the direction controlling drum 2. The feeding drum 3 rotates in the direction (counterclockwise direction FIG. 1) opposite to that of the direction controlling drum 2 at a circumferential speed equal to that of the direction controlling drum 2. As shown in FIGS. 3, 9A and 9B, three sets of feeding sections each including six, in total, feeding pockets 131 arranged in three rows by two columns are provided with an equal space given from each other in a circumferential direction on the circumferential face of the feeding drum 3 similarly as in the direction controlling drum 2.

Figure 10:
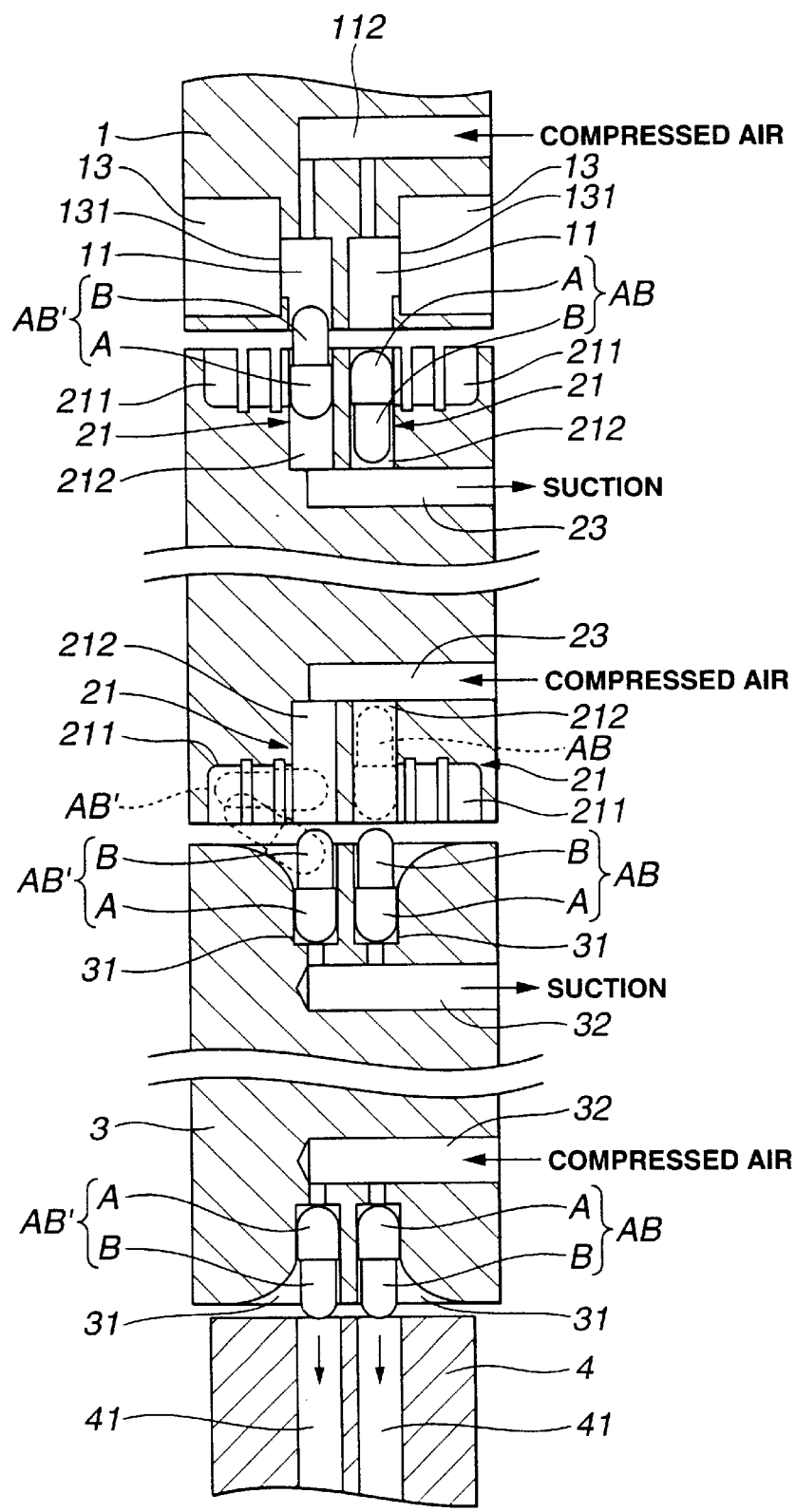
FIG. 10 is an explanatory view illustrating posture control of an empty capsule performed by the supplying section.

As shown in FIGS. 9A, 9B and 10, each of the feeding pockets 31 is formed in such a shape that an opening thereof is partly expanded in a widthwise direction of the feeding drum 3 so that an empty capsule AB can be introduced into the feeding pocket 31 readily, and is communicated with a suction/blowing out hole 32 formed in the proximity of the diametrally inner side of the feeding drum 3. In particular, one suction/blowing out hole 32 is communicated with two feeding pockets 31, 31 juxtaposed with each other along a widthwise direction of the feeding drum 3 and is open to one side face of the feeding drum 3. Further, as shown in FIGS. 4, 9A and 9B, a third suction and exhaust block 3a is disposed between the feeding drum 3 and the column p on which the feeding drum 3 is supported in a similar manner as in the case of the supply drum 1 and the direction controlling drum 2. A suction path 321 and a compressed air path 322 are provided on the front face side (adjacent the feeding drum 3) of the third suction and exhaust block 3a as shown in FIGS. 3, 4, 9A and 9B. In a condition where the suction path 321 and the suction/blowing out hole 32 are registered with each other, the insides of the feeding pockets 31 are subject to suction, but in another condition where the compressed air path 322 and the suction/blowing out hole 32 are registered with each other, air is blown out into the feeding pockets 31. Further, as shown in FIGS. 1, 3, 9A and 9B, a guide member 33 for preventing a capsule from slipping out is provided along the circumferential face of the feeding drum 3 extending from one side portion (left side portion in the figures) to the lower side of the circumferential face of the feeding drum 3.

The magazine 4 which can accommodate a predetermined number of empty capsules AB is disposed below the feeding drum 3. As shown in FIGS. 3, 9A and 9B, the magazine 4 has two capsule supply paths 41 each having a hollow of a diameter a little greater than the outer diameter of the empty capsules AB. Empty capsules AB charged from the feeding drum 3 are accommodated once into the capsule supply paths 41 and aligned along a vertical direction in a vertically standing state in the capsule supply paths 41, and the empty capsules AB are successively supplied from the lower ends of the capsule supply paths 41 to the filling mechanism section 7.

The magazine 4 is disposed at a position at which, when a feeding pocket 31 passes by the guide member 33 and is opened downwardly as a result of rotation of the feeding drum 3, the top end opening of one of the capsule supply paths 41 is opposed to the opening of the feeding pocket 31. The capsule supply path 41 is formed in such a shape that the opening thereof is partly expanded toward the direction of rotation of the feeding drum 3 so that an empty capsule AB can enter the capsule supply path 41 with certainty. Further, photoelectric sensors 42a, 42b formed from a pair of light emission and reception elements are disposed at a lower end portion and an upper portion of the magazine 4. The insides of the capsule supply paths 41 are normally supervised by the photoelectric sensors 42a, 42b to detect presence or absence of an empty capsule AB and a rough number of such empty capsules AB, and a shutter 43 (refer to FIGS. 9A and 9B) disposed at a lower end portion of the magazine 4 is opened or closed by an air cylinder 44 (refer to FIG. 9A) in response to a result of the detection.

Operation of the supplying section 5 which includes the supply drum 1, direction controlling drum 2, feeding drum 3 and magazine 4 is described with reference to FIGS. 3, 4 and 10. First, empty capsules AB accommodated in the hopper h are successively supplied to and accommodated into the supply pockets 11 of the supply drum 1 (refer to FIG. 3). In this instance, when the supply drum 1 rotates in the counterclockwise direction as in FIG. 3 and the supply pockets 11 pass the supplying location from the hopper h, one of the suction/blowing out holes 112 communicated with the supply pockets 11 is registered with the suction path 112a so that the insides of the supply pockets 11 are sucked. Consequently, empty capsules AB are accommodated from the hopper h into the supply pockets 11 with certainty by making use of an attracting force by suction. In this instance, the empty capsules AB accommodated in the supply pockets 11 exhibit a condition where those in the erected state with the cap A directed upwardly and those in the inverted state with the body B directed upwardly are mixed together.

The capsules accommodated in the supply pockets 11 of the supply drum 1 are transported to the lower side of the supply drum 1 as the supply drum 1 rotates and are transported to the direction controlling pockets 21 of the direction controlling drum 2. Thereupon, one of the suction/blowing out holes 112 which is communicated with supply pockets 11 is registered with the compressed air path 112c (refer to FIGS. 3 and 4) and one of the suction/blowing out holes 23 which is communicated with direction controlling pockets 21 is registered with the suction path 231 (refer to FIGS. 3 and 4). Consequently, as shown in FIG. 10, air is blown out from the supply pockets 11 to force out the accommodated empty capsules AB while the direction controlling pockets 21 are brought into a sucking condition so that the empty capsules AB are received with certainty.

Here, while the 42, in total, supply pockets 11 arranged in 21 rows by 2 columns are provided uniformly on the circumferential face of the supply drum 1, only the three sets of direction controlling sections composed of the six, in total, direction controlling pockets 21 arranged in three rows by two columns are provided with an equal space given from each other in the circumferential direction on the direction controlling drum 2. Therefore, empty capsules AB accommodated in the supply pockets 11 of the supply drum 1 are successively transferred six by six of three rows by two columns to the direction controlling drum 2. Thus, empty capsules AB supplied from the hopper h to the supply drum 1 are not transferred from the supply drum 1 to the direction controlling drum 2 during a first round of rotation of the supply drum 1, but after they pass by the supplying location from the hopper h, they are transferred to the direction controlling drum 2 during a second round of rotation. Accordingly, even if an empty capsule AB is not successfully accommodated into one of the supply pockets 11 upon supplying of empty capsules AB from the hopper h, leaving the supply pocket 11 empty, when the supply pocket 11 passes by the supplying location from the hopper h for the second round, an empty capsule AB is accommodated into the empty pocket. Consequently, empty capsules AB are supplied to the direction controlling drum 2 with certainty while an empty direction controlling pocket 21 does not appear on the direction controlling drum 2.

Further, since each empty capsule AB is composed of the cap A and the body B which are temporarily coupled to each other such that they can be separated from each other readily, the cap A and the body B are liable to be separated, and there is a case that caps A and bodies B of empty capsules AB separate from each other are sometimes present in the hopper h. If such a cap A or body B is accommodated solely into a supply pocket 11 of the supply drum 1, then the cap A or body B accommodated solely in the supply pocket 11 is removed at a location at which a brush roller b is disposed (refer to FIGS. 3 and 4) immediately after the capsule supplying location from the hopper h.

In particular, as shown in FIGS. 3 and 4, at the location of the brush roller b, the capsule discharging space portion 13 (refer to FIG. 4) communicated with the supply pockets 11 is registered with the suction path 13a of the first suction and exhaust block 1a or the suction path 13b of the small suction block 1b and the insides of the supply pockets 11 are subject to suction. At this time, if a body B is accommodated solely in one of the supply pockets 11, for example, as shown in FIG. 6B, then the body B is sucked by an attracting force generated by the suction from the suction path 13a (or 13b) through a defective capsule discharging window 131 provided at the lower portion of the supply pocket 11 into the capsule discharging space portion 13 in a rolling condition and discharged and removed from the supply pocket 11. In this instance, as shown in FIG. 6B, since an empty capsule AB composed of a cap A and a body B coupled to each other has a greater length than the sole cap A or the sole body B, it will be caught in the supply pocket 11 and cannot be rolled out from the supply pocket 11 into the defective capsule discharging window 131 and consequently will not be sucked out of the supply pocket 11 to the capsule discharging space portion 13.

It is to be noted that, while the defective capsule discharging window 131 described above has a length set smaller than that of a capsule AB, so that a normal empty capsule AB composed of the cap A and the body B temporarily coupled to each other cannot be discharged through the defective capsule discharging window 131, the length of the defective capsule discharging window 131 is suitably adjusted to a length with which, taking the width (diameter) of the supply pockets 11 and the diameter and the length of the empty capsule AB into consideration, the cap A and the body B can pass through the defective capsule discharging window while rolling, but an empty capsule composed of the cap A and the body B temporarily coupled to each other cannot roll into the defective capsule discharging window.

In this manner, when only the cap A or only the body B is accommodated into a supply pocket 11, the cap A or the body B is removed immediately. Thus, empty capsules which are transported by the supply drum 1 and transferred to the direction controlling drum 2 are only empty capsules AB composed of the cap A and the body B temporarily coupled to each other whereas the sole cap A or the sole body B is prevented from being transferred to the direction controlling drum 2. It is to be noted that, since transfer of empty capsules from the supply pockets 111 to the direction controlling pockets 21 is not performed during the first round of rotation of the supply drum 1 but is performed during the second round of rotation of the supply drum 1 as described hereinabove, a supply pocket 11 which is in an empty state because the accommodated cap A or body B only themselves have been removed from it, accommodate an empty capsule AB when it passes the supplying location from the hopper h again, and the empty capsule AB is transferred to the direction controlling drum 2.

Then, as shown in FIG. 10, each empty capsule AB which has entered with the body B side directed forwardly and been accommodated into a direction controlling pocket 21 of the direction controlling drum 2 is fully accommodated in the direction controlling pocket 21 in an erected state with the cap A thereof directed upwardly (adjacent the circumferential face of the drum) and with the body B thereof entered to the bottom portion 212 of the direction controlling pocket 21. Meanwhile, each empty capsule AB' which has entered with the cap A side directed forwardly and been accommodated into a direction controlling pocket 21 cannot enter the bottom portion 212 because the diameter of the cap A is greater than the diameter of the bottom portion 212, and is held in the direction controlling pocket 21 in a state wherein the body B portion projects from the circumferential face of direction controlling the drum. As the direction controlling drum 2 rotates in this state, the body B portion projecting from the circumferential face of the drum enters a V-shaped groove 221 (refer to FIG. 7B) of the direction controlling guide member 22 and is in contact with a side edge portion of the direction controlling protrusion 222

(refer to FIG. 7B). As the direction controlling drum 2 further rotates, the empty capsule AB' is pressed outwardly in a widthwise direction of the drum 2 so that it is fallen down into the upper portion 211 of the direction controlling pocket 21 around a fulcrum provided by the end of the cap portion A. Consequently, the empty capsule AB' is accommodated into and held in the upper portion 211 of the direction controlling pocket 21 in a horizontally lying state along a widthwise direction of the drum 2. In this manner, the empty capsule AB' accommodated in a horizontally lying state in the upper portion 211 of the direction controlling pocket 21 has the cap A portion thereof positioned on the bottom portion 212 of the direction controlling pocket 21 and has the body B side directed to the outer side.

Then, the empty capsules AB and AB' accommodated in the direction controlling pockets 21 of the direction controlling drum 2 in this manner are transferred to the feeding pockets 31 of the feeding drum 3 as shown in FIG. 10. Also in this instance, the suction/blowing out hole 23 communicated with the direction controlling pockets 21 is registered with the compressed air path 232 (refer to FIGS. 3 and 4) and the suction/blowing out hole 32 communicated with the feeding pockets 31 is registered with the suction path 321 (refer to FIGS. 3 and 4). Consequently, as shown in FIG. 10, air is blown out from the bottom portions 212 of the direction controlling pockets 21 to force out the empty capsules AB and AB' accommodated in the direction controlling pockets 21 while the feeding pockets 31 are put into an attracting condition to receive the empty capsules AB and AB' with certainty.

At this time, as shown in FIG. 10, the empty capsules AB having been accommodated in the direction controlling pockets 21 in an erected state with the body B portions thereof entered the bottom portions 212 of the direction controlling pockets 21 are entered the feeding pockets 31 with the cap A sides thereof directed forwardly and are accommodated in an inverted state with the body B sides directed upwardly (adjacent the drum circumferential face side). Meanwhile, as indicated by broken lines in FIG. 10, an empty capsule AB' accommodated in the horizontally lying state at the upper portion 211 of a direction controlling pocket 21 is forced out to a feeding pocket 31 with the cap A directed forwardly by air blown out from the bottom portion 212 of the direction controlling pocket 21 and is sucked into the feeding pocket 31 with the cap A directed forwardly. Consequently, the empty capsule AB' is entered the feeding pocket 31 with the cap A directed forwardly until it is accommodated in an inverted state with the body B directed upwardly (adjacent the drum circumferential face). Accordingly, the empty capsules AB and AB' transferred to the feeding drum 3 are all accommodated in an inverted state with the bodies side B thereof directed upwardly in the feeding pockets 31.

Here, when each of the empty capsules AB is transferred from a supply pocket 11 of the supply drum 1 into a direction controlling pocket 21 of the direction controlling drum 2, even if it is in an erected state which allows it to enter the direction controlling pocket 21 with the body B directed forwardly, it sometimes occurs by some reason that the body B portion thereof does not enter the bottom portion 212 of the direction controlling pocket 21, but it is accommodated into the upper portion 211 of the direction controlling pocket 21 in a reversely horizontally lying state wherein the cap A side is directed to the outside or the cap A portion of the empty capsule AB projects from the circumferential face of the drum in an erected state with the cap A directed upwardly and the empty capsule AB is laid down horizontally by the direction controlling guide member 22 into a reversely horizontally lying state wherein the cap A is directed to the outside. If such a reversely horizontally lying capsule as just described is transferred to a feeding pocket 31 of the feeding drum 3 with the body B directed forwardly, then the empty capsule in an erected state with the cap A directed upwardly is mixed in empty capsules which are held in the feeding drum 3 on which all empty capsules must be in an inverted state with the bodies B thereof directed upwardly. Therefore, in the direction controlling drum 2 in the present embodiment, it does not transfer such a reversely horizontally lying capsule to the feeding drum 3, but recovers and removes it from the direction side controlling drum 2.

That is, while the reversely horizontally lying capsule is accommodated in the upper portion 211 of a direction controlling pocket 21 in a condition where the cap A side thereof is directed to the outside of the direction controlling drum 2, since the upper portion 211 of the direction controlling pocket 21 is formed as a cap holding portion 211a in which the width w of an outer side portion of which is smaller than the diameter of the cap A as shown in FIG. 8-B, the reversely horizontally lying capsule is pressed by the direction controlling guide member 22 (refer to FIG. 3) so that it is put into a condition where it is confined to the cap holding portion 211a of the upper portion 211 of the direction controlling pocket 21 and cannot be pulled out readily from the direction controlling pocket 21. Consequently, also upon transfer from the direction controlling drum 2 to the feeding drum 3, the reversely horizontally lying capsule does not move to a feeding pocket 31 of the feeding drum 3, but passes by the hand-over point and is further transported while it is held in the upper portion 211 of the direction controlling pocket 21. Then, the reversely horizontally lying capsule is scraped out from the upper portion 211 of the direction controlling pocket 21 by the scraper 25 (refer to FIG. 7A) inserted in one of the scraper insertion grooves 24 (refer to FIGS. 7A, 7B, 8A and 8B) which extends across the upper portion 211 of the direction controlling pocket 21 and is recovered into the recovery can 251.

The empty capsules AB and AB' in an erected state transferred from the direction controlling drum 2 to the feeding drum 3 in such a manner as described above move to the lower side as the feeding drum 3 rotates, and are charged into the capsule supply paths 41, 41 of the magazine 4 disposed under the feeding drum 3 with the bodies B thereof directed forwardly as shown in FIG. 10. Consequently, a predetermined number of empty capsules AB are reserved once in a condition where all of them are put into such a status that they are registered in a vertical direction in an upright state and then are successively supplied to the filling mechanism section 7 from the lower end openings of the capsule supply paths 41, 41.

In this instance, as shown in FIGS. 9A and 9B, the lower end opening of each of the capsule supply paths 41 is closed by the shutter 43 when the filling machine is activated, and at a point of time when a predetermined number of empty capsules AB are reserved in the capsule supply paths 41 and detected by the photoelectric sensor 42a on the upper side and it is confirmed that the predetermined number of empty capsules AB are reserved therein, the air cylinders 44 is operated to open the shutters 43 to start a supplying operation of the empty capsules AB into the filling mechanism section 7.

Here, the feeding pockets 31 provided on the feeding drum 3 are disposed such that three sets of feeding pocket groups each including six, in total, feeding pockets 31 arranged in three rows by two columns as described above are spaced from each other given an equal distance, although the feeding drum 3 continuously rotates at a fixed speed, charging of empty capsules AB into the capsule supply paths 41 of the magazine 4 from the feeding drum 3 is performed such that an operation of charging, after six, in total, empty capsules arranged in three rows by two columns are successively charged, next six empty capsules are charged successively after lapse of a predetermined time and is repeated. Thus, successive charging is repeated intermittently. On the other hand, supply of empty capsules from the lower end openings of the capsule supply paths 41 of the magazine 4 into the charging mechanism section 7 is performed successively. Consequently, supply of empty capsules AB to the charging mechanism section 7 is performed while increasing and decreasing of the number of empty capsules AB reserved in the capsule supply paths 41 of the magazine 4 are repeated.

Further, if, an empty capsule in a reversely horizontally lying state described above occurs frequently and therefore an empty feeding pocket 31 appears comparatively frequently on the feeding drum 3 as a result of removal of the empty capsule therefrom or due to some other reason, the balance between the charging rate for charging empty capsules AB from the feeding drum 3 into the magazine 4 and supplying rate for supplying the empty capsule from the magazine 4 into the filling mechanism section 7 is lost and the number of empty capsules AB reserved in the capsule supply paths 41 of the magazine 4 decreases, to thereby make any one of the capsule supply paths 41 empty even momentarily, then this is detected by the photoelectric sensor 42b on the lower side. Consequently, the shutters 43 (refer to FIGS. 9A and 9B) are closed to stop supplying empty capsules AB into the filling mechanism section 7 and operations after supply of empty capsules such as transportation of empty capsules by the filling mechanism section 7, separation, filling of contents substance, re-coupling and discharging are all stopped. Then, at a point of time when the predetermined number of empty capsules are reserved in the capsule supply paths 41 of the magazine 4 again, this is detected by the photoelectric sensor 42b on the upper side. Consequently, the shutters 43 are opened to resume supply of empty capsules to the filling mechanism section 7, and the operations following to the supply of empty capsules are resumed simultaneously to resume the capsule filling operation.

Figure 11:
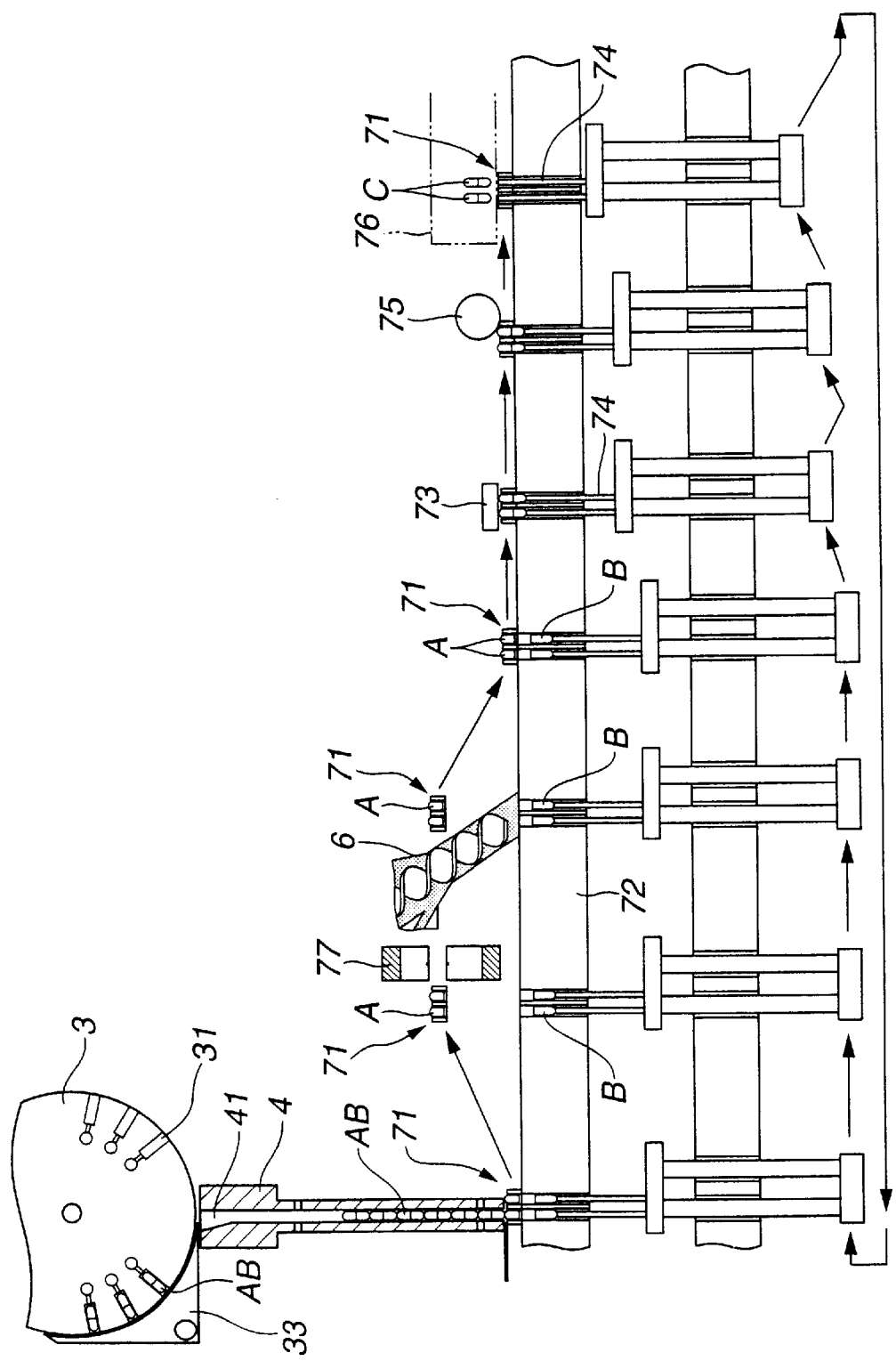
FIG. 11 is an explanatory view successively illustrating a contents substance filling operation by the capsule filling machine.

Thereafter, as shown in FIG. 11, the filling mechanism section 7 having received the empty capsules AB from the magazine 4 accommodates the empty capsules AB in an erected state into capsule pockets, each composed of a cap pocket of a cap segment 71 and a body pocket of a body disk 72, separates the empty capsules accommodated in the capsule pockets into caps A and bodies B, holds and transports the caps A and the bodies B in the cap pockets of the cap segment 71 and the body pockets of the body disk 72, respectively, separates the cap segment 71 from the body disk 72 and performs a separation defective inspection by means of a separation defective detector 77. After performing the separation defective inspection, the filling mechanism section 7 fills contents substance into the bodies B held in the body disk 72 by means of the contents substance filling apparatus 6, contacts the cap segment 71 with the body disk 72 again, pushes up the bodies B by means of plunger pins 74 to the caps A held by a holding plate 73 to temporarily couple the caps A and the bodies B to each other, further presses the caps A by means of a coupling roller 75 to fully couple the caps A and the bodies B to each other, further pushes up resulting filled capsule products C by means of the plunger pins 74 to discharge the filled capsule products C from the body disk 72 and the cap segment 71, and discharges the filled capsule products C to the outside of the apparatus through a discharging chute 76 to recover them. Then, the cap pockets of the cap segment 71 and the body pockets of the body disk 72 are cleaned by a cleaner 78 (refer to FIG. 2) and the filling mechanism section 7 receives empty capsules AB from the supplying section 5 again so that similar operations are repeated.

In this manner, the capsule filling machine of the present embodiment successively supplies empty capsules AB each composed of a cap and a body temporarily coupled to each other while controlling the posture of the empty capsules AB to an erected state with the cap A directed upward by means of the supplying section 5, transports the empty capsules AB by means of the transporting unit of the filling mechanism section 7 with the empty capsules AB kept in the erected state, the empty capsules AB are separated into caps and bodies during transportation, fills contents substance into the bodies B by means of the contents substance filling apparatus 6, and couples the caps A and the bodies B to each other again to produce filled capsule products C, and then discharges and recovers the filled capsule products C from the apparatus.

In this instance, when empty capsules AB are supplied while the posture thereof is controlled to an erected state by means of the supplying section 5, even if a cap A only or a body B only of a coupling defective capsule whose caps A and bodies B are in a separate state from each other is accommodated in a supply pocket 11 of the supply drum 1, this is removed automatically by a simple construction, and also a reverse defective capsule whose direction is opposite thereto is automatically removed by a simple mechanism. Consequently, empty capsules composed of the cap A and the body B coupled to each other can be supplied stably and with certainty, and filled capsule products C can be produced stably without suffering from such defects as a filling defect and a transportation defect.

In particular, according to the removing mechanism for removing a coupling defective capsule provided for the supply drum 1 of the supplying section 5, there is no necessity to detect whether an empty capsule accommodated in a supply pocket 11 is a normal empty capsules AB or a coupling defective capsule composed only of a cap A or a body B, but by merely sucking the inside of all of the supply pockets 11 through the defective capsule discharging window 131, only the cap A or the body B of the coupling defective capsule is selectively discharged automatically from the supply pocket 11. Consequently, a coupling defective capsule can be discharged and removed readily and with certainty without requiring a complicated mechanism, complicated control and so forth.

Meanwhile, according to the removing mechanism for removing a reverse defective capsule provided for the direction controlling drum 2 of the supplying section 5, a reverse defective capsule is automatically disabled from being transferred to the feeding drum 3 without the necessity to perform any operation and without the necessity for a complicated mechanism for detecting whether a capsule accommodated in a direction controlling pocket 21 is a capsule in a normal horizontally lying state directed in a predetermined direction or a reverse defective capsule in a horizontally lying state directed in the opposite direction, or for selectively discharging and removing a detected reverse defective capsule, and in this state, the reverse defective capsule passes by the hand-over point to the feeding drum 3 and is then compulsorily removed from the direction controlling pocket 21 automatically by the scraper 25 at the predetermined location on the downstream side of the hand-over point to the feeding drum 3 in the transportation direction to which a normal capsule is not transported at all. Consequently, a reverse defective capsule can be discharged and removed simply and with certainty without the necessity for a complicated structure, cumbersome control and so forth.

Figure 12:
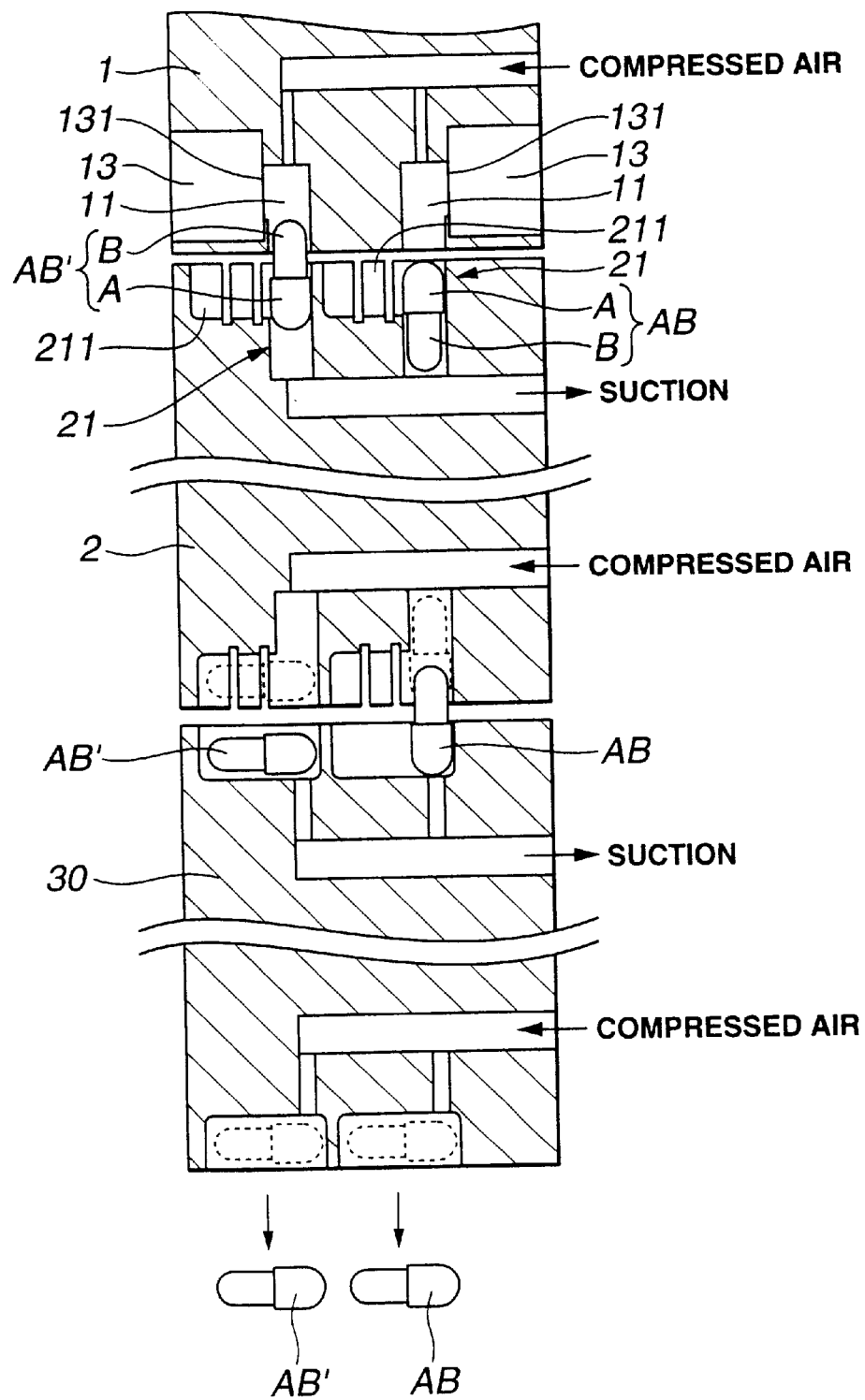
FIG. 12 is a schematic sectional view showing another example of a capsule supplying section which includes the defective capsule removing mechanism according to the embodiment of the present invention.
Figure 13:
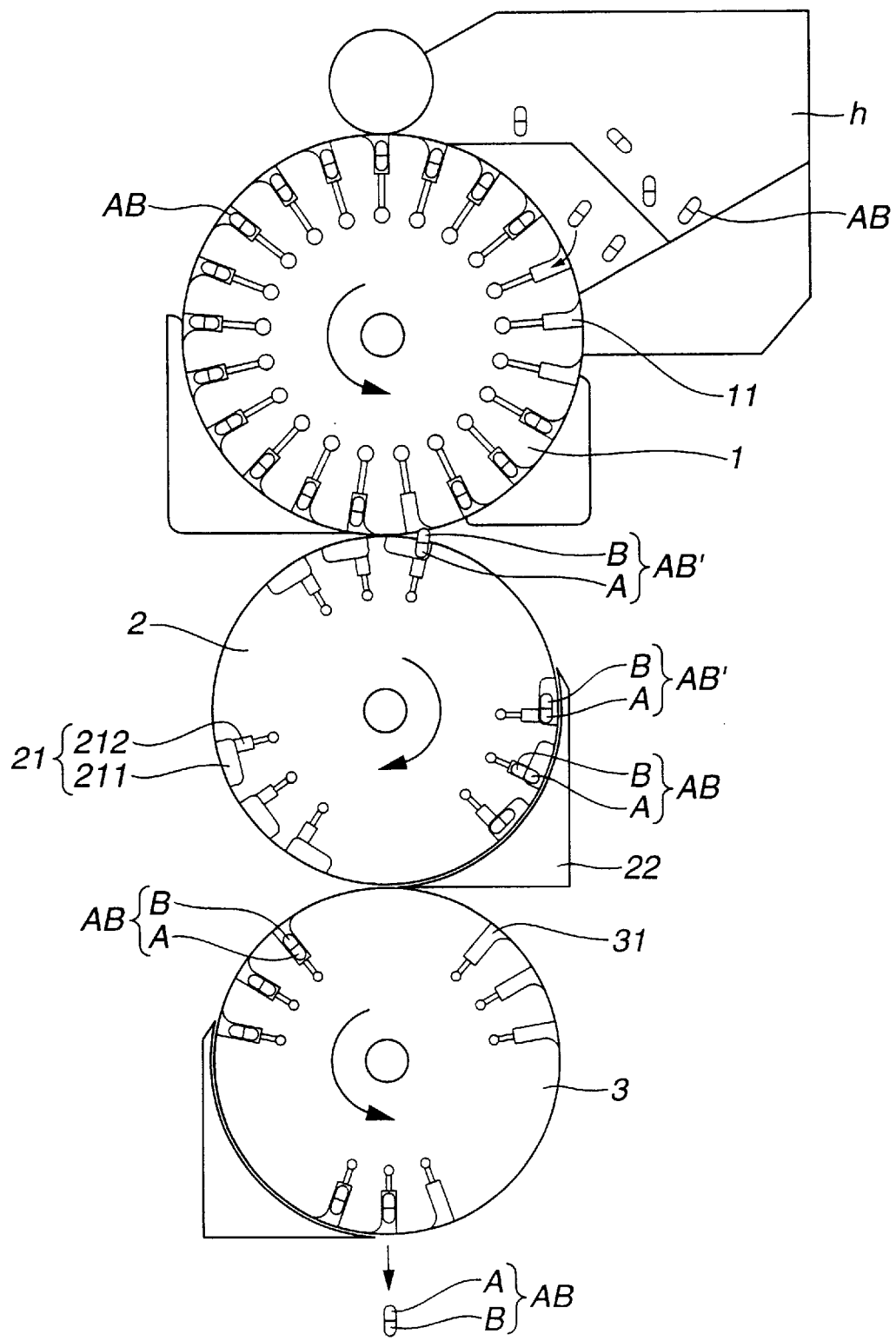
FIG. 13 is a schematic view showing an example of a capsule supplying section used in a conventional capsule filling machine.

It is to be noted that the defective capsule removing mechanism of the present invention is not limited to the embodiment described above but can be suitably modified. For example, while, in the embodiment described above, an example wherein the removing mechanism of the present invention is employed in a supplying section of a capsule filling machine which supplies empty capsules while controlling the posture of them to an erected state is described, it is also possible to employ the removing mechanism of the present invention in a supplying section which is used in a capsule sealing machine or a capsule appearance inspection apparatus for supplying capsules while controlling the posture of them to a horizontally lying state directed in a fixed direction. In this instance, for example, as shown in FIG. 12, the directions of the upper portions 211 of the direction controlling pocket 21 of the direction controlling drum 2 are all set to the same direction, and a second direction controlling drum 30 which is similar to the feeding drum 3 except that it does not have the removing mechanism is used in place of the feeding drum 3. Thus, empty capsules AB' supplied in an inverted state from the supply drum 1 are put into a horizontally lying state by the first direction controlling drum 2 while empty drums AB supplied in an erected state from the supply drum 1 are put into a horizontally lying state by the second direction controlling drum 30 so that all capsules are supplied after the postures thereof are converted into a horizontally lying state wherein their directions are controlled to the fixed direction. It is to be noted that the other construction is similar to that of the supplying unit 5 of the embodiment described hereinabove.

Further, the defective capsule removing mechanism of the present invention can be used as a mechanism for removing a coupling defective capsule or a reverse defective capsule from a capsule pocket of a transporting unit which merely transports capsules without performing directional control. Furthermore, for example, the shapes, the numbers, the number of columns, the arrangement method and so forth of the pockets provided on the drums 1, 2 and 3 can be modified suitably, and also the other construction may be modified suitably without departing from the scope of the present invention.

As described above, according to the defective capsule removing mechanism of the present invention, a coupling defective capsule such as a body B or a cap A by itself or a reverse defective capsule can be discharged and removed automatically and with certainty by a comparatively simple mechanism.

What is claimed is:

1. A defective capsule removing mechanism for removing, when a capsule composed of a cap and a body coupled to each other is accommodated and transported in a capsule pocket, only when the cap or the body of a coupling defective capsule whose cap and body are separated from each other is accommodated into said capsule pocket, the cap or the capsule from said capsule pocket, wherein:

a defective capsule discharging window shorter in length than that of the capsule is provided in a portion of a circumferential wall of said capsule pocket adjacent one end of the capsule accommodated in said capsule pocket in a longitudinal direction of the capsule, and said capsule pocket is subject to suction through said defective capsule discharging window such that the cap or the body of the coupling defective capsule accommodated in said capsule pocket is drawn into said defective capsule discharging window in a rolling manner from one end side thereof directed forwardly so that the cap or the body of the coupling defective capsule is discharged to the outside of said capsule pocket through said defective capsule discharging window.

2. The defective capsule removing mechanism according to claim 1, wherein said capsule pocket is a capsule pocket formed on an outer circumferential face of a capsule transporting drum for accommodating and holding a capsule in an uprightly standing posture, and said defective capsule discharging window is provided adjacent a bottom portion of said capsule pocket.

3. A defective capsule removing mechanism, comprising:

a capsule pocket for receiving a capsule therein and transporting the capsule, the capsule having a body and a cap coupled to each other, said capsule pocket having a circumferential wall;

a defective capsule discharging window provided in a portion of said circumferential wall of said capsule pocket adjacent one end of the capsule accommodated in said capsule pocket in a longitudinal direction of the capsule, said defective capsule discharging window being shorter in length than that of the capsule; and a suction device for subjecting said capsule pocket to suction through said defective capsule discharging window;

whereby when a cap or a body of a defectively coupled capsule whose cap and body are separated from each other is accommodated in said capsule pocket, the cap or the body is removed from said capsule pocket such that the cap or the body is drawn into said defective capsule discharging window in a rolling manner from one end side thereof directed forwardly so that the cap or the body of the defectively coupled capsule is discharged to the outside of said capsule pocket through said defective capsule discharging window.

4. The defective capsule removing mechanism according to claim 3, wherein said capsule pocket is formed on an outer circumferential face of a capsule transporting drum for accommodating and holding a capsule in an uprightly standing posture.

5. The defective capsule removing mechanism according to claim 4, wherein said defective capsule discharging window is provided adjacent a bottom portion of said capsule pocket.

* * * * *